United States Patent
Zhang et al.

(10) Patent No.: US 11,683,524 B2
(45) Date of Patent: *Jun. 20, 2023

(54) METHOD AND APPARATUS FOR POINT CLOUD COMPRESSION

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/501,677

(22) Filed: Oct. 14, 2021

(65) Prior Publication Data
US 2022/0038743 A1 Feb. 3, 2022

Related U.S. Application Data

(63) Continuation of application No. 17/010,363, filed on Sep. 2, 2020, now Pat. No. 11,368,717.
(Continued)

(51) Int. Cl.
*H04N 19/597* (2014.01)
*H04N 19/96* (2014.01)
(Continued)

(52) U.S. Cl.
CPC ....... *H04N 19/597* (2014.11); *H04N 19/1883* (2014.11); *H04N 19/436* (2014.11);
(Continued)

(58) Field of Classification Search
USPC .................................................... 375/240.26
See application file for complete search history.

(56) References Cited

U.S. PATENT DOCUMENTS

| | | | |
|---|---|---|---|
| 9,035,807 B2 | 5/2015 | Jiang et al. | |
| 11,368,717 B2 * | 6/2022 | Zhang | H04N 19/46 |

(Continued)

FOREIGN PATENT DOCUMENTS

| | | |
|---|---|---|
| WO | 2017/209961 | 12/2017 |
| WO | 2017217191 A1 | 12/2017 |
| WO | 2019011637 A1 | 1/2019 |

OTHER PUBLICATIONS

Mekuria et al., "Requirements for Point Cloud Compression," n16330, Geneva, CH, Feb. 2016 (3 pages).

(Continued)

*Primary Examiner* — Behrooz M Senfi
(74) *Attorney, Agent, or Firm* — Arentfox Schiff LLP

(57) ABSTRACT

Aspects of the disclosure provide methods, apparatuses, and a non-transitory computer-readable medium for point cloud compression and decompression. In a method, syntax information of a point cloud is decoded from a coded bitstream. The syntax information indicates that parallel decoding is to be performed on occupancy codes of nodes in a range of one or more partitioning depths in an octree partitioning structure of the point cloud is determined. The parallel decoding is performed on the occupancy codes of the nodes. The point cloud is reconstructed based on the occupancy codes of the nodes.

20 Claims, 9 Drawing Sheets

Related U.S. Application Data

(60) Provisional application No. 62/961,518, filed on Jan. 15, 2020, provisional application No. 62/958,131, filed on Jan. 7, 2020, provisional application No. 62/901,047, filed on Sep. 16, 2019.

(51) Int. Cl.
| | |
|---|---|
| *H04N 19/169* | (2014.01) |
| *H04N 19/70* | (2014.01) |
| *H04N 19/46* | (2014.01) |
| *H04N 19/436* | (2014.01) |

(52) U.S. Cl.
CPC ............. *H04N 19/46* (2014.11); *H04N 19/70* (2014.11); *H04N 19/96* (2014.11)

(56) References Cited

U.S. PATENT DOCUMENTS

| | | | |
|---|---|---|---|
| 2013/0077684 | A1 | 3/2013 | Chen et al. |
| 2015/0146794 | A1 | 5/2015 | Hoang |
| 2016/0086353 | A1 | 3/2016 | Lukac et al. |
| 2017/0214943 | A1 | 7/2017 | Cohen et al. |
| 2017/0347100 | A1 | 11/2017 | Chou et al. |
| 2019/0116372 | A1 | 4/2019 | Cohen et al. |
| 2020/0219290 | A1 | 7/2020 | Tourapis et al. |
| 2020/0221139 | A1 | 7/2020 | Vosoughi et al. |
| 2020/0413096 | A1 | 12/2020 | Zhang et al. |
| 2021/0004991 | A1 | 1/2021 | Zhang et al. |
| 2021/0084333 | A1* | 3/2021 | Zhang ................. H04N 19/70 |
| 2021/0118188 | A1 | 4/2021 | Zhang et al. |
| 2021/0194946 | A1 | 6/2021 | Hannuksela |
| 2021/0195225 | A1 | 6/2021 | Li et al. |
| 2021/0209807 | A1 | 7/2021 | Oh |
| 2022/0038743 | A1* | 2/2022 | Zhang ................. H04N 19/597 |
| 2022/0248053 | A1* | 8/2022 | Zhang ................. H04N 19/597 |
| 2022/0248054 | A1* | 8/2022 | Zhang ................. H04N 19/436 |
| 2022/0272381 | A1* | 8/2022 | Zhang ................. H04N 19/70 |

OTHER PUBLICATIONS

Tulvan et al., "Use Cases for Point Cloud Compression (PCC)," N16331, Geneva, CH, Jun. 2016 (8 pages).
Information technology—MPEG-I (Coded Representation of Immersive Media)—Part 9: Geometry-based Point Cloud Compression, CD Stage, 2019 (104 pages).
"G-PCC codec description v5," N18891, Geneva, CH, Oct. 2019 (75 pages).
International Search Report dated Sep. 3, 2020 in Application No. PCT/US2020/070167, (13 pages).
Ranger, "Icosatree Data Partitioning of Massive Geospatial Point Clouds with User-Selectable Entities and Surface Modelin," Rochester Institute of Technology, Dec. 2016 (50 pages).
Information technology—MPEG-I (Coded Representation of Immersive Media)—Part 9: Geometry-based Point Cloud Compression, WD stage, ISO/IEC 2019 (89 pages).
Mammou et al. , "G-PCC codec description v2," International Organisation for Standardisation, N18189, Marrakech, MA , Jan. 2019 (40 pages).
Australian Office Action dated Jul. 27, 2022 in Application No. 2020303920, 5 pages.
Indian Office Action dated Mar. 30, 2022 in Application No. 202147047431, 5 pages.
International Search Report and Written Opinion dated Sep. 29, 2020 in International Application No. PCT/US20/40325, 8 pgs.
Lassere, et al., m48906_Planar mode in octree-based geometry coding, Blackberry, 33 pgs.
Zhang, et al., [G-PCC] [New proposal] Implicit geometry partition for point cloud coding, ISO/IEC JTC1/SC29/WG11 MPEG2019/M49231, Jul. 2019 Gothenburg, Sweden, 14 pgs.
G-PCC codec description v4, ISO/IEC JTC1/SC29/WG11 N18673, Jul. 2019, Gothenburg, SE, 63 pgs.
U.S. Appl. No. 62/867,063, "Implicit Geometry Partition for Point Cloud Coding", filed Jun, 26, 2019 (30 pages).
U.S. Appl. No. 62/869,946 "Signaling of QP variations for Adaptive Geometry Quantization in Point Cloud Coding", filed Jul. 2, 2019 (30 pages).
U.S. Appl. No. 62/904,384, "On Geometry Coding for Point Clouds", filed Sep. 23, 2019 (22 pages).
Supplementary European Search Report dated Oct. 26, 2022 in Application No. 20865464.0, pp. 1-9.
Xiang Zhang et al: "[G-PCC] [new proposal] parallel octree coding for point cloud compression", 128. MPEG Meeting; Oct. 7, 2019-Oct. 11, 2019; Geneva; (Motion Picture Expert Group or ISO/IEC JTC1/SC29/WG11), No. m50930, Oct. 2, 2019, pp. 1-7.
Xiang Zhang et al: "[G-PCC] [CE13.22] Report on Parallel Octree Coding for Point Cloud Compression", 129. MPEG Meeting; Jan. 13, 2020-Jan. 17, 2020; Brussels; (Motion Picture Expert Group or ISO/IEC JTC1/SC29/WG11), No. m52397, Jan. 16, 2020, pp. 1-6.
Ohji Nakagami et al: "Point cloud compression technology proposal by Sony", 120. MPEG Meeting; Oct. 23, 2017-Oct. 27, 2017; Macau; (Motion Picture Expert Group or ISO/EC JTC1/SC29/WG11), No. m41665, Oct. 21, 2017, pp. 1-43.

\* cited by examiner

METHOD AND APPARATUS FOR POINT CLOUD COMPRESSION

INCORPORATION BY REFERENCE

This present application is a continuation of U.S. patent application Ser. No. 17/010,363, "METHOD AND APPARATUS FOR POINT CLOUD COMPRESSION," filed on Sep. 2, 2020, which claims the benefit of priority to U.S. Provisional Application No. 62/901,047, "PARALLEL OCTREE CODING FOR POINT CLOUD CODING" filed on Sep. 16, 2019, U.S. Provisional Application No. 62/958,131, "ADDITIONAL INFORMATION ON ADAPTIVE GEOMETRY QUANTIZATION AND PARALLEL OCTREE CODING FOR POINT CLOUD CODING" filed on Jan. 7, 2020, and U.S. Provisional Application No. 62/961,518, "BITSTREAM OFFSETS SIGNALING IN PARALLEL OCTREE CODING FOR POINT CLOUD CODING" filed on Jan. 15, 2020. The disclosures of the prior applications are incorporated by reference herein in their entirety.

TECHNICAL FIELD

The present disclosure describes embodiments generally related to point cloud compression.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide methods for point cloud compression and decompression. In a method, syntax information of a bounding box of a point cloud is decoded from a coded bitstream. The syntax information indicates an octree partitioning structure for the bounding box of the point cloud. Whether the syntax information indicates that parallel decoding is to be performed on occupancy codes of nodes in a range of one or more partitioning depths in the octree partitioning structure is determined. The parallel decoding is performed on the occupancy codes of the nodes in response to the syntax information indicating that the parallel decoding is to be performed on the occupancy codes of the nodes in the range of the one or more partitioning depths in the octree partitioning structure. The bounding box is reconstructed based on the occupancy codes of the nodes.

In an embodiment, whether the syntax information indicates that the occupancy codes of the nodes in the range of the one or more partitioning depths in the octree partitioning structure are to be decoded in parallel is determined based on one of a signaled flag and a minimum partitioning depth at which the parallel decoding is to be performed.

In an embodiment, the parallel decoding is performed on the occupancy codes of the nodes based on the minimum partitioning depth and a maximum partitioning depth at which the parallel decoding is to be performed. The maximum partitioning depth is equal to or less than a maximum partitioning depth of the octree partitioning structure.

In an embodiment, a sub-bitstream in the coded bitstream is determined for each of the one or more partitioning depths based on a bitstream offset corresponding to each of the one or more partitioning depths. The parallel decoding is performed on the sub-bitstreams of the one or more partitioning depths.

In an embodiment, the bitstream offset corresponding to each of the one or more portioning depths is included in the syntax information.

In an embodiment, the parallel decoding is performed on the occupancy codes of the nodes in the range of the one or more partitioning depths based on context variables of the occupancy codes.

In an embodiment, initial probabilities of the context variables of the occupancy codes of the nodes are determined as one or more predefined values.

In an embodiment, initial probabilities of the context variables of the occupancy codes of the nodes are determined based on probabilities of context variables of occupancy codes of parent nodes of a plurality of nodes. The plurality of nodes is in a minimum partitioning depth at which the parallel decoding is to be performed.

In an embodiment, initial probabilities of the context variables of the occupancy codes of the nodes are determined based on probabilities of context variables of occupancy codes of a subset of parent nodes of the nodes.

Aspects of the disclosure also provide apparatuses for point cloud compression and decompression. One apparatus includes processing circuitry that decodes syntax information of a bounding box of a point cloud from a coded bitstream. The syntax information indicates an octree partitioning structure for the bounding box of the point cloud. The processing circuitry determines whether the syntax information indicates that parallel decoding is to be performed on occupancy codes of nodes in a range of one or more partitioning depths in the octree partitioning structure. The processing circuitry performs the parallel decoding on the occupancy codes of the nodes in response to the syntax information indicating that the parallel decoding is to be performed on the occupancy codes of the nodes in the range of the one or more partitioning depths in the octree partitioning structure. The processing circuitry reconstructs the bounding box based on the occupancy codes of the nodes.

Aspects of the disclosure also provide a non-transitory computer-readable medium storing instructions which when executed by a computer for point cloud compression/decompression cause the computer to perform any one or a combination of the methods for point cloud compression/decompression.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Point Cloud Compression Systems

Figure 1:
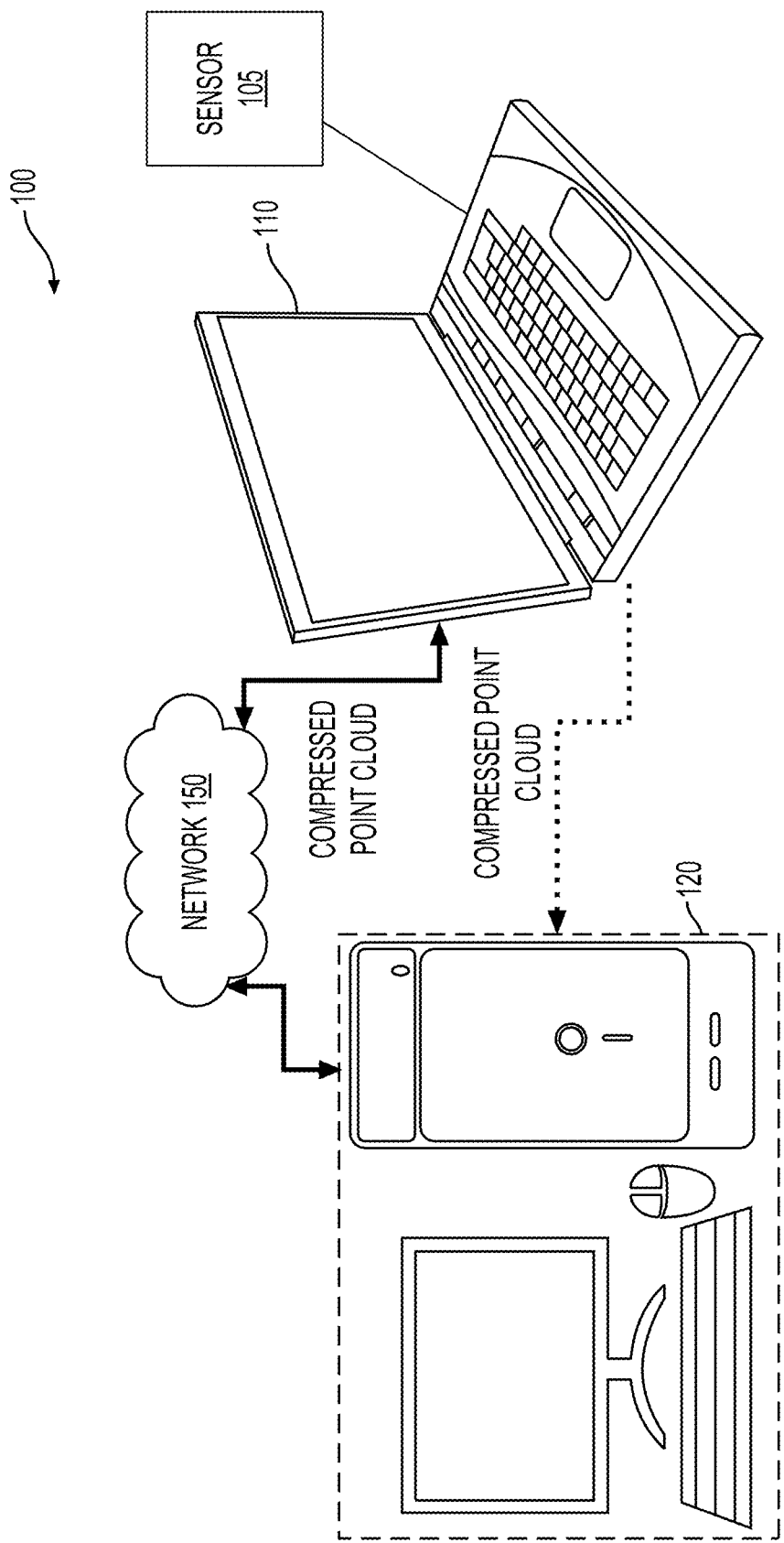
FIG. 1 shows a schematic illustration of a simplified block diagram of a communication system according to an embodiment of the disclosure.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) perform unidirectional transmission of point cloud data. For example, the terminal device (110) may compress a point cloud (e.g., points representing a structure) that is captured by a sensor 105 connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks and/or the Internet. For the purposes of the present discussion, the architecture and topology of the network (150) for the operation of the present disclosure is not limited in the disclosed embodiments unless explained herein below.

Figure 2:
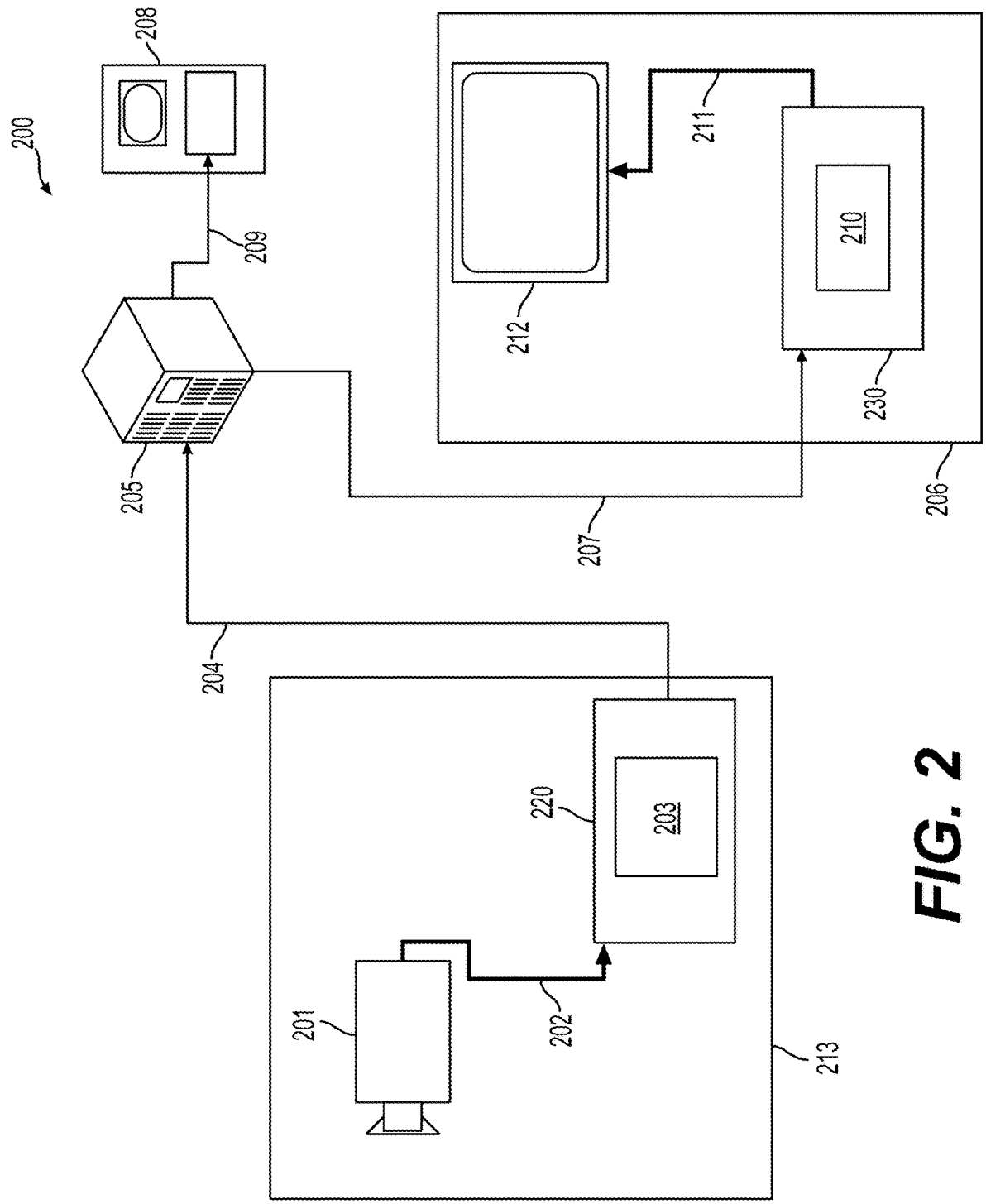
FIG. 2 shows a schematic illustration of a simplified block diagram of a streaming system (200) according to an embodiment of the disclosure.

FIG. 2 illustrates a streaming system (200) that can be applied to various point cloud enabled applications, including, 3D telepresence application, and virtual reality application. A streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212). In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

It is noted that the electronic devices (220) and (230) can include other components (not shown). For example, the electronic device (220) can include a decoder (not shown) and the electronic device (230) can include an encoder (not shown) as well.

Figure 3:
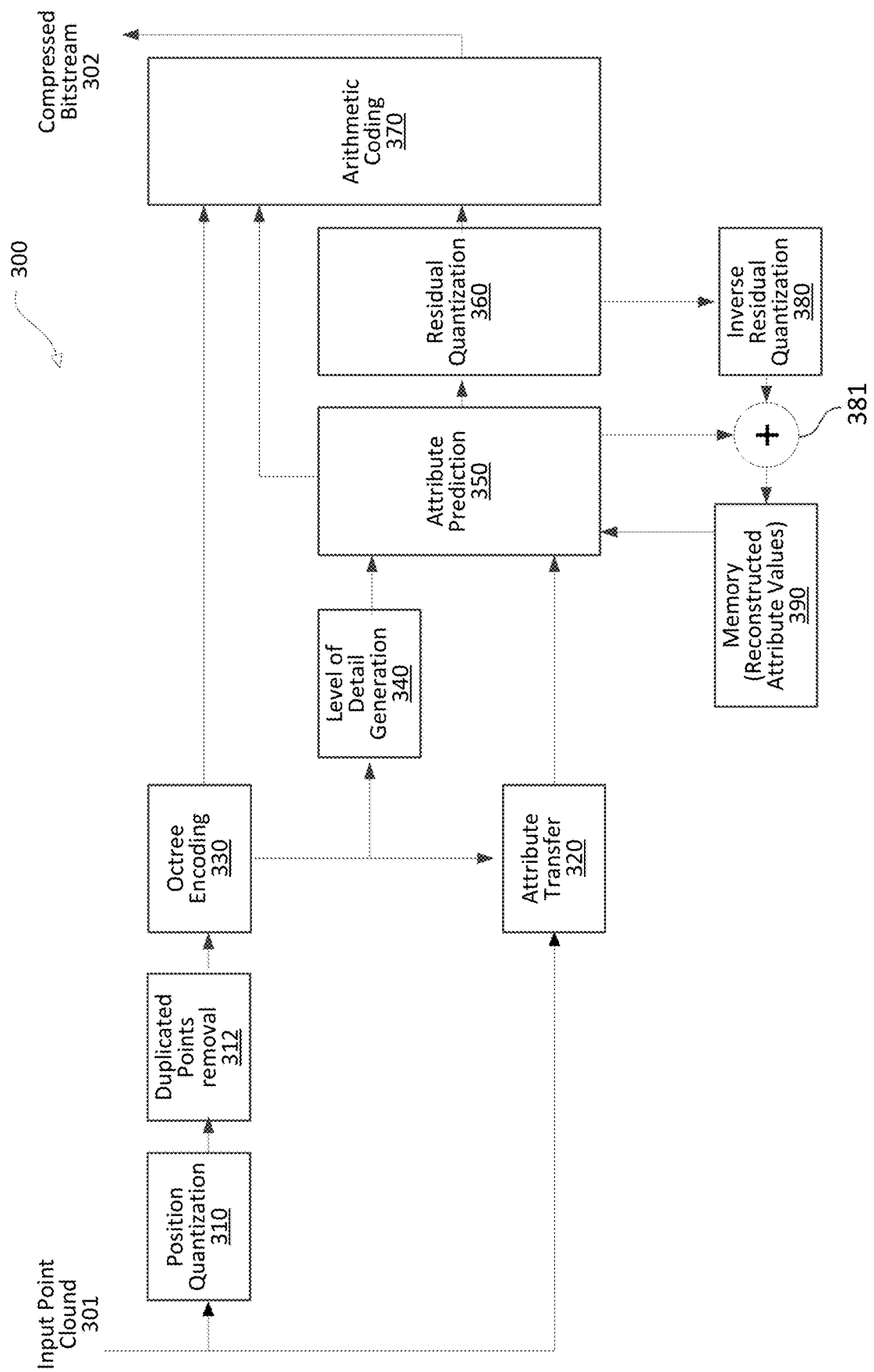
FIG. 3 shows an exemplary encoder according to an embodiment of the disclosure.

FIG. 3 shows an exemplary encoder (300) in accordance with an embodiment. The encoder can be configured to receive point cloud data and compress the point cloud data to generate a bit stream carrying compressed point cloud data. In an embodiment, the encoder (300) can include a position quantization module (310), a duplicated points removal module (312), an octree encoding module (330), an attribute transfer module (320), an LOD generation module (340), an attribute prediction module (350), a residual quantization module (360), an arithmetic coding module (370), an inverse residual quantization module (380), an addition module (381), and a memory (390) to store reconstructed attribute values.

As shown, an input point cloud (301) can be received at the encoder (300). Positions (3D coordinates) of the point cloud (301) are provided to the position quantization module (310). The position quantization module (310) is configured to quantize the coordinates to generate quantized positions. The optional duplicated points removal module (312) is configured to receive the quantized positions and perform a filter process to identify and remove duplicated points. The octree encoding module (330) is configured to receive filtered positions from the duplicated points removal module (312), and perform an octree-based encoding process to generate a sequence of occupancy codes that describe a 3D grid of voxels. The occupancy codes are provided to the arithmetic coding module (370).

The attribute transfer module (320) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (330). The attributes after the transfer operations are provided to the attribute prediction module (350). The LOD generation module (340) operates on the re-ordered points output from the octree encoding module (330) and re-organizes the points into different LODs. LOD information is supplied to the attribute prediction module (350).

The attribute prediction module (350) processes the points according to an LOD-based order indicated by the LOD information from the LOD generation module (340). The attribute prediction module (350) generates an attribute prediction for a current point based on reconstructed attributes of a set of neighboring points of the current point stored in the memory (390). Prediction residuals can subsequently be obtained based on original attribute values received from the attribute transfer module (320) and locally generated attribute predictions. When candidate indices are used in the respective attribute prediction process, an index corresponding to a selected prediction candidate may be provided to the arithmetic coding module (370).

The residual quantization module (360) is configured to receive the prediction residuals from the attribute prediction module (350), and perform quantization to generate quantized residuals. The quantized residuals are provided to the arithmetic coding module (370).

The inverse residual quantization module (380) is configured to receive the quantized residuals from the residual quantization module (360), and generate reconstructed prediction residuals by performing an inverse of the quantization operations performed at the residual quantization module (360). The addition module (381) is configured to receive the reconstructed prediction residuals from the inverse residual quantization module (380), and the respective attribute predictions from the attribute prediction module (350). By combining the reconstructed prediction residuals and the attribute predictions, the reconstructed attribute values are generated and stored to the memory (390).

The arithmetic coding module (370) is configured to receive the occupancy codes, the candidate indices (if used), the quantized residuals (if generated), and other information, and perform entropy encoding to further compress the received values or information. As a result, a compressed bitstream (302) carrying the compressed information can be generated. The bitstream (302) may be transmitted, or otherwise provided, to a decoder that decodes the compressed bitstream, or may be stored in a storage device.

Figure 4:
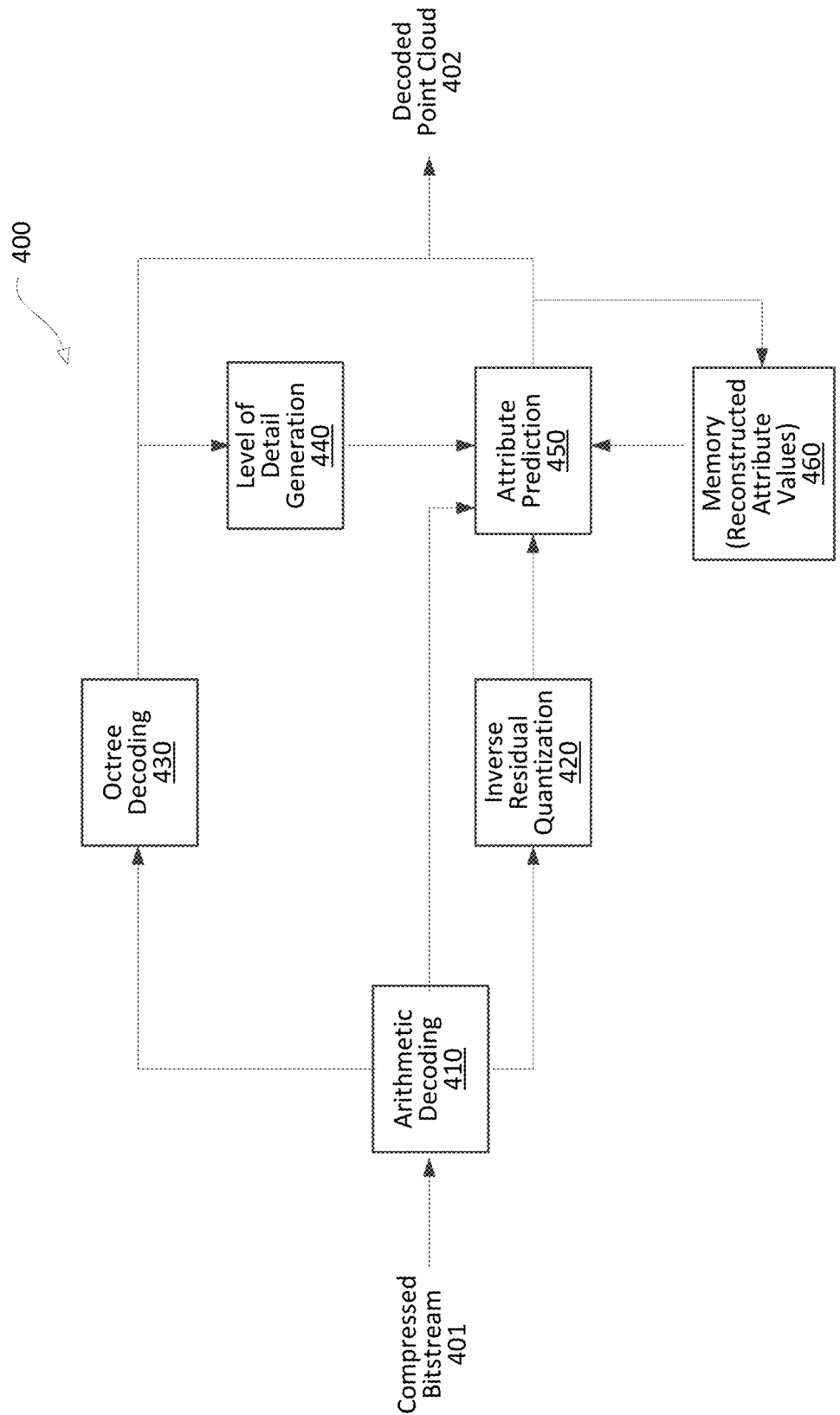
FIG. 4 shows an exemplary decoder according to an embodiment of the disclosure.

FIG. 4 shows an exemplary decoder (400) in accordance with an embodiment. The decoder (400) can be configured to receive a compressed bitstream and perform point cloud data decompression to decompress the bitstream to generate decoded point cloud data. In an embodiment, the decoder (400) can include an arithmetic decoding module (410), an inverse residual quantization module (420), an octree decoding module (430), an LOD generation module (440), an attribute prediction module (450), and a memory (460) to store reconstructed attribute values.

As shown, a compressed bitstream (401) can be received at the arithmetic decoding module (410). The arithmetic decoding module (410) is configured to decode the compressed bitstream (401) to obtain quantized residuals (if generated) and occupancy codes of a point cloud. The octree decoding module (430) is configured to determine reconstructed positions of points in the point cloud according to the occupancy codes. The LOD generation module (440) is configured to re-organize the points into different LODs based on the reconstructed positions, and determine an LOD-based order. The inverse residual quantization module (420) is configured to generate reconstructed residuals based on the quantized residuals received from the arithmetic decoding module (410).

The attribute prediction module (450) is configured to perform an attribute prediction process to determine attribute predictions for the points according to the LOD-based order. For example, an attribute prediction of a current point can be determined based on reconstructed attribute values of neighboring points of the current point stored in the memory (460). The attribute prediction module (450) can combine the attribute prediction with a respective reconstructed residual to generate a reconstructed attribute for the current point.

A sequence of reconstructed attributes generated from the attribute prediction module (450) together with the reconstructed positions generated from the octree decoding module (430) corresponds to a decoded point cloud (402) that is output from the decoder (400) in one example. In addition, the reconstructed attributes are also stored into the memory (460) and can be subsequently used for deriving attribute predictions for subsequent points.

In various embodiments, the encoder (300) and decoder (400) can be implemented with hardware, software, or combination thereof. For example, the encoder (300) and decoder (400) can be implemented with processing circuitry such as one or more integrated circuits (ICs) that operate with or without software, such as an application specific integrated circuit (ASIC), field programmable gate array (FPGA), and the like. In another example, the encoder (300) and decoder (400) can be implemented as software or firmware including instructions stored in a non-volatile (or non-transitory) computer-readable storage medium. The instructions, when executed by processing circuitry, such as one or more processors, cause the processing circuitry to perform functions of the encoder (300) and decoder (400).

It is noted that the attribute prediction modules (350) or (450) configured to implement the attribute prediction techniques disclosed herein can be included in other decoders or encoders that may have similar or different structures from what is shown in FIG. 3 and FIG. 4. In addition, the encoder (300) and decoder (400) can be included in a same device, or separate devices in various examples.

II. Point Cloud Compression in Test Model 13 (TMC13) in MPEG

1. Point Cloud Data

Point cloud has been widely used in recent years. For example, point cloud data is used in autonomous driving vehicles for object detection and localization. Point cloud data can also be used in geographic information systems (GIS) for mapping, and used for cultural heritage to visualize and archive cultural heritage objects and collections, etc.

A point cloud contains a set of high dimensional points, typically three dimensional (3D), each including 3D position information and additional attributes such as color, reflectance, etc. They can be captured using multiple cameras and depth sensors, or Lidar in various setups, and may be made up of thousands to billions of points to realistically represent the original scenes.

Therefore, compression technologies are needed to reduce the amount of data required to represent a point cloud for faster transmission or reduction of storage.

2. Geometry Coding by Octree Partition

Geometry information and associated attributes, such as color or reflectance, can be separately compressed (e.g., in TMC13). The geometry information, which includes the 3D coordinates of the point cloud, can be coded by an octree-partition with its occupancy information. The attributes can be compressed based on a reconstructed geometry using, for example, prediction, lifting, and/or region adaptive hierarchical transform techniques.

Figure 5:
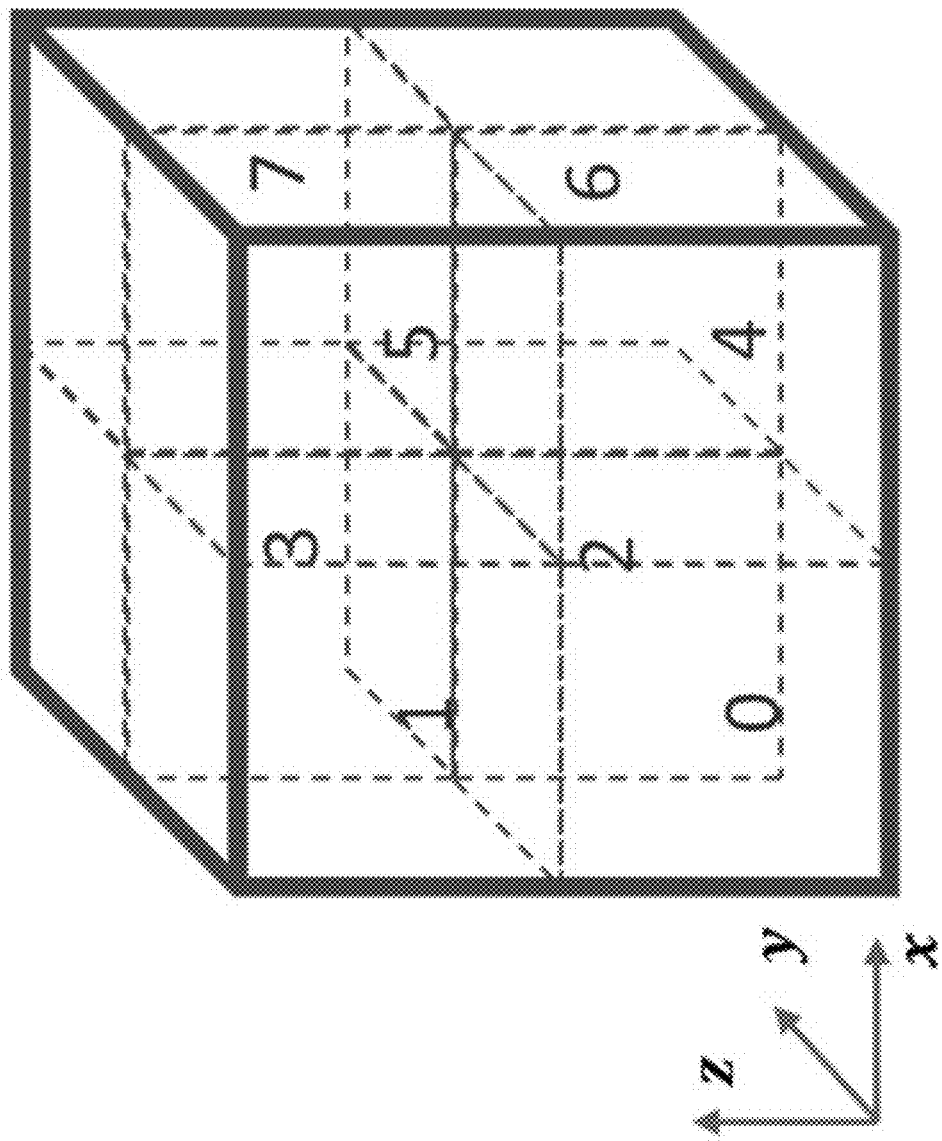
FIG. 5 shows an exemplary octree partition in a 3D cube according to an embodiment of the disclosure.

An input of the octree partition is a collection of transformed positions, i.e., $P_i$, i=1, 2, ..., N. FIG. 5 shows an exemplary octree partition in a 3D cube according to an embodiment of the disclosure. The 3D cube in solid lines is partitioned into eight smaller equal-sized cubes in dashed lines. The octree partition (e.g., in TMC13) can be recursively performed to divide the original 3D space into smaller units, and the occupancy information of every sub-space is encoded by an entropy coder to efficiently represent geometry positions.

The octree coding can be lossless. That is, all the input positions are encoded without any further quantization. For example, in TMC13, if an octree geometry codec is used, a geometry encoding proceeds as follows.

First, a cubical axis-aligned bounding box is defined by two points (0,0,0) and $(2^d, 2^d, 2^d)$, where $2^d$ defines a size of the bounding box and d is encoded to a bitstream. It assumes that all the points $P_i$ are inside the bounding box.

Then, an octree partition structure is built by recursively subdividing the bounding box. At each stage, a cube of the bounding box is subdivided into 8 sub-cubes. An 8-bit code, referred to as an occupancy code, is then generated by associating a 1-bit value with each sub-cube in order to indicate whether a respective sub-cube contains points (e.g., for a full sub-cube, the corresponding bit has value 1) or not (e.g., for an empty sub-cube, the corresponding bit has value 0). Only full sub-cubes with a size greater than a value, for example 1 (i.e., non-voxels), are further subdivided. The occupancy code for each cube of the bounding box is then compressed by an arithmetic encoder. Each cube of the bounding box corresponds to a node of the octree partition structure. Therefore, the occupancy code of each cube corresponds to the node of the respective cube.

3. Encoding of Occupancy Code

An occupancy code of a current node of the octree partition structure can be compressed by an arithmetic encoder. The occupancy code can be denoted as S which is an 8-bit integer, and each bit in S indicates an occupancy status of each child node of the current node. Two exemplary encoding methods (e.g., in TMC13) for the occupancy code are bit-wise encoding and byte-wise encoding. In TMC13, the bit-wise encoding is enabled by default. Either method performs arithmetic coding with context modeling to encode the occupancy code, where the context status is initialized at the beginning of the whole coding process and is updated during the coding process.

For bit-wise encoding, eight bins in S are encoded in a certain order where each bin is encoded by referring to the occupancy status of neighboring nodes and child nodes of the neighboring nodes, where the neighboring nodes are at the same level of the current node.

For byte-wise encoding, S is encoded by referring to: (1) an adaptive look-up table (A-LUT), which keeps track of the N (e.g., 32) most frequent occupancy codes; and (2) a cache which keeps track of the last different observed M (e.g., 16) occupancy codes.

A binary flag indicating whether S is in the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index in the cache is encoded by using a binary arithmetic encoder. Otherwise, if S is not in the cache, then the binary representation of S is encoded by using a binary arithmetic encoder.

Figure 6:
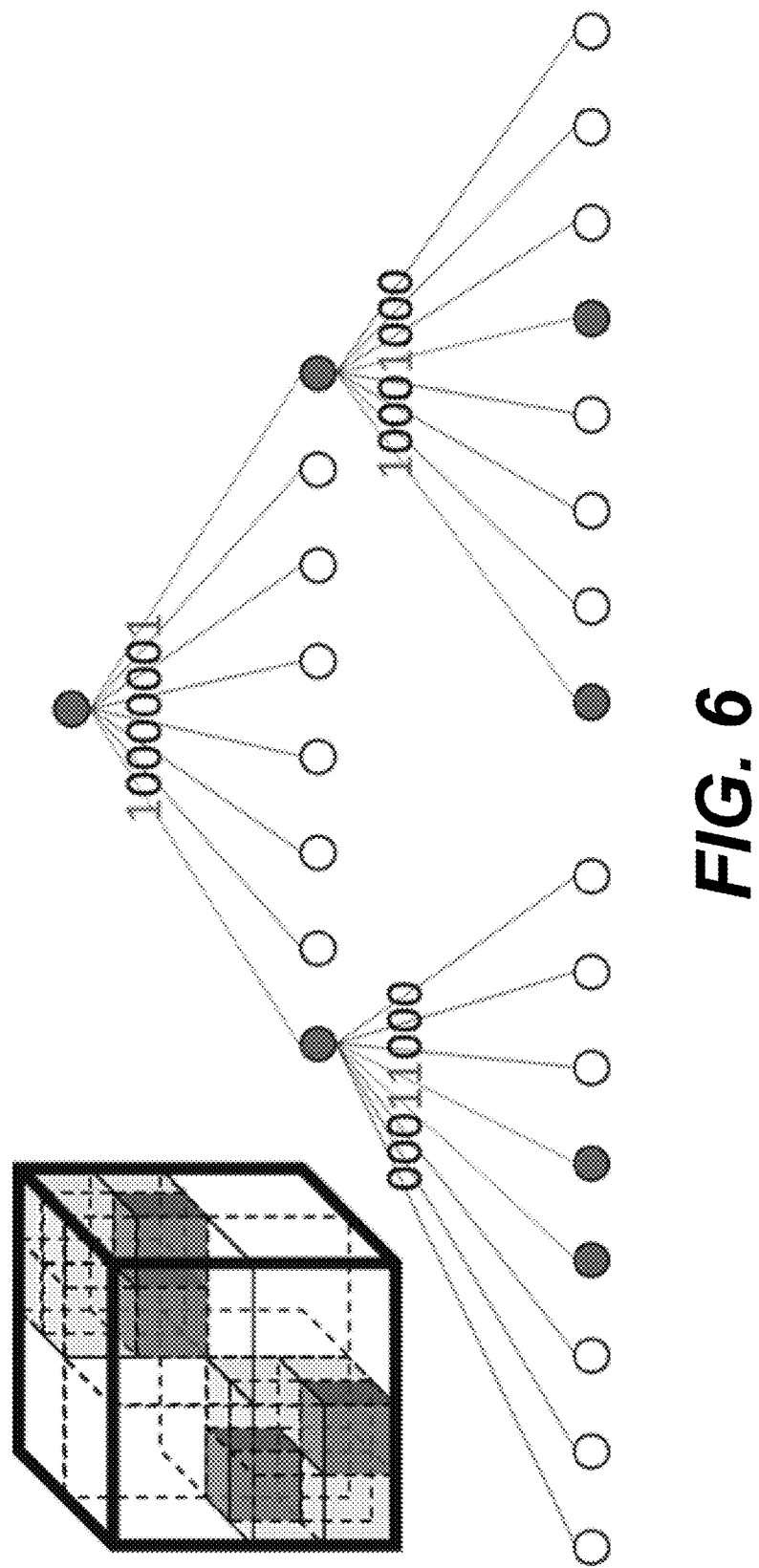
FIG. 6 shows an exemplary two-level octree partition and the corresponding occupancy code according to an embodiment of the disclosure.

A decoding process can start by parsing the dimensions of the bounding box from the bitstream. The same octree structure is then built by subdividing the bounding box according to the decoded occupancy codes. An example of two-level octree partition and the corresponding occupancy codes are shown in FIG. 6, where cubes and nodes that are shaded indicate that they are occupied by points.

III. Parallel Octree Coding

In some related cases (e.g., in TMC13), the octree encoding and decoding processes have to be conducted in a predefined sequential order, since the coding of a current node is dependent on a status of coded neighboring nodes (and their child nodes) of the current node. Further, context variables of the arithmetic coding engine are updated on the fly. Therefore, the octree coding in each partition depth cannot be started until the coding in a previous depth is finished.

The disclosure presents an octree coding (encoding and decoding) scheme in which parallel coding, instead of sequential coding, can be performed for one or more octree partition depths. It is noted that this disclosure is not limited to the TMC13 software or MPEG-PCC standard but is a general solution for PCC systems.

According to aspects of the disclosure, when the parallel octree coding is enabled, coding (encoding and decoding) processes of certain octree partition depths can be performed in parallel. Thus, the coding (encoding and decoding) time can be accelerated significantly. Syntaxes can be signaled to specify the octree partition depths where the parallel octree coding is applied to. For instance, let the octree partition depth be d=0, 1, ..., M−1, where M is the total number of octree partition depths. The parallel octree coding can be applied to a range of depths from $d_{min}$ to $d_{max}$, where $0 < d_{min} \leq d_{max} \leq M-1$, indicating the octree coding of those depths can be performed in parallel.

For example, for an octree partition depth $d_{min} < d \leq d_{max}$) that is coded in parallel, an octree node in the depth d can be encoded or decoded once a parent node of the octree node in the depth d−1 is encoded or decoded. Similarly, once the octree node in the depth d is encoded or decoded, occupied child nodes of the octree node in the depth d+1 can be encoded or decoded. Therefore, the parallel octree coding can be achieved.

1. Signaling of Controlling Flag and Depth Constraints

According to aspects of the disclosure, control parameters of the parallel octree coding can be signaled in the high level syntax. It is noted the disclosure is not limited to the given examples. Other parameters can be signaled as well. The control parameters can be specified in a sequence parameter set or slice header or geometry parameter set of the bitstream.

In an embodiment, a flag can be signaled to indicate whether the parallel octree coding is enabled or disabled.

The flag can be specified in the geometry parameter set, as shown in Table 1. For example, when gps_parallel_octree_coding_flag equals 1, the parallel octree coding is enabled for the sequence or slice. When gps_parallel_octree_coding_flag equals 0, the parallel octree coding is disabled for the sequence or slice.

TABLE 1

| | Descriptor |
|---|---|
| geometry_parameter_set( ) { | |
|   gps_geom_parameter_set_id | ue(v) |
|   gps_seq_parameter_set_id | ue(v) |
|   gps_box_present_flag | u(1) |
|   if(gps_box_present_flag){ | |
|     gps_gsh_box_log2_scale_present_flag | u(1) |
|     if(gps_gsh_box_log2_scale_present_flag == 0) | |
|       gps_gsh_box_log2_scale | ue(v) |
|   } | |
|   unique_geometry_points_flag | u(1) |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   gps_parallel_octree_coding_flag | u(1) |
|   gps_extension_present_flag | u(1) |
|   if(gps_extension_present_flag) | |
|     while(more_data_in_byte_stream( ) ) | |
|       gps_extension_data_flag | u(1) |
|   byte_alignment( ) | |
| } | |

In some embodiments, the minimal octree depth at which the parallel octree coding is enabled can be specified, for example in the geometry parameter set. In an embodiment, the minimal octree depth at which the parallel octree coding is enabled, i.e., $d_{min}$, is specified by gps_parallel_octree_coding_min_depth_minus_one in the geometry parameter set, as shown in Table 2. For example, when gps_parallel_octree_coding_flag equals 1, $d_{min}$=gps_parallel_octree_coding_min_depth_minus_one+1.

TABLE 2

| | Descriptor |
|---|---|
| geometry_parameter_set( ){ | |
|   gps_geom_parameter_set_id | ue(v) |
|   ... | ... |
|   log2_trisoup_node_size | ue(v) |
|   gps_parallel_octree_coding_flag | u(1) |
|   if(gps_parallel_octree_coding_flag) | |
|     gps_parallel_octree_coding_min_depth_mimus_one | ue(v) |
|   ... | ... |
|   byte_alignment( ) | |
| } | |

In an embodiment, the minimal octree depth at which the parallel octree coding is enabled, i.e., $d_{min}$, is specified by gps_parallel_octree_coding_min_depth in the geometry parameter set, as shown in Table 3, where gps_parallel_octree_coding_min_depth specifies $d_{min}$ as $d_{min}$=gps_parallel_octree_coding_min_depth. In this case, gps_parallel_octree_coding_flag is not signaled but can be inferred from the value of gps_parallel_octree_coding_min_depth. For example, if gps_parallel_octree_coding_min_depth equals zero, gps_parallel_octree_coding_flag is inferred to be 0. Otherwise, gps_parallel_octree_coding_flag is inferred to be 1.

TABLE 3

| | Descriptor |
|---|---|
| geometry_parameter_set( ){ | |
|   gps_geom_parameter_set_id | ue(v) |
|   ... | ... |
|   log2_trisoup_node_size | ue(v) |
|   gps_parallel_octree_coding_min_depth | ue(v) |
|   ... | ... |
|   byte_alignment( ) | |
| } | |

In an embodiment, the minimal octree depth at which the parallel octree coding, i.e., $d_{min}$, is specified by gps_parallel_octree_coding_max_nodesize_log 2 in the geometry parameter set, as shown in Table 4, where gps_parallel_octree_coding_max_nodesize_log 2 specifies $d_{min}$ as $d_{min}$=M−gps_parallel_octree_coding_max_nodesize_log 2. In this case, gps_parallel_octree_coding_flag is not signaled but can be inferred from the value of gps_parallel_octree_coding_max_nodesize_log 2. For example, if gps_parallel_octree_coding_max_nodesize_log 2 equals zero, gps_parallel_octree_coding_flag is inferred to be 0. Otherwise, gps_parallel_octree_coding_flag is inferred to be 1.

TABLE 4

| | Descriptor |
|---|---|
| geometry_parameter_set( ) { | |
|   gps_geom_parameter_set_id | ne(v) |
|   ... | ... |
|   log2_trisoup_node_size | ne(y) |
|   gps_parallel_octree_coding_max_nodesize_log2 | ue(v) |
|   ... | ... |
|   byte_alignment( ) | |
| } | |

In an embodiment, both the minimal and maximum octree depths at which the parallel octree coding are enabled, i.e., $d_{min}$ and $d_{max}$, are specified by syntaxes in the geometry parameter set, as shown in Table 5. For example, gps_parallel_octree_coding_min_depth_minus_one specifies $d_{min}$ as $d_{min}$=gps_parallel_octree_coding_min_depth_minus_one+1 and gps_parallel_octree_coding_max_depth_minus_min_depth_minus1 specifies $d_{max}$ as $d_{max}$=gps_parallel_octree_coding_max_depth_minus_min_depth_minus1+$d_{min}$+1.

TABLE 5

| | Descriptor |
|---|---|
| geometry_parameter_set( ) { | |
|   gps_geom_parameter_set_id | ne(v) |
|   ... | ... |
|   log2_trisoup_node_size | ne(v) |
|   gps_parallel_octree_coding _flag | u(1) |
|   if (gps_parallel_octree_coding _flag) { | |

TABLE 5-continued

| | Descriptor |
|---|---|
| gps_parallel_octree_coding_min_depth_minus_one | ue (v) |
| gps_parallel_octree_coding_max_depth_minus_min_depth_minus1 | ue (v) |
| } | |
| ... | ... |
| byte_alignment( ) | |
| } | |

In an embodiment, the minimal octree depth at which the parallel octree coding is enabled, i.e., $d_{min}$, is fixed and not signaled. Only the maximum octree depth that enables parallel octree coding, i.e., $d_{max}$, is signaled in the geometry parameter set, as shown in Table 6. For example, gps_parallel_octree_coding_max_depth_mimus_min_depth_minus1 specifies $d_{max}$ as $d_{max}$=gps_parallel_octree_coding_max_depth_minus_min_depth_minus1+$d_{min}$+1.

TABLE 6

| | Descriptor |
|---|---|
| geometry_parameter_set( ) { | |
|   gps_geom_parameter_set_id | ne(v) |
|   ... | ... |
|   log2_trisoup_node_size | ne(v) |
|   gps_parallel_octree_coding _flag | u(1) |
|   if (gps_parallel_octree_coding _flag) { | |
|     gps_parallel_octree_coding_max_depth_mimus_min_depth_minus1 | ue (v) |
|   } | |
| ... | ... |
| byte_alignment( ) | |
| } | |

In an embodiment, the minimal octree depth at which the parallel octree coding is enabled, i.e., $d_{min}$, is specified by gps_parallel_octree_coding_max_nodesize_log 2_minus1 in the geometry parameter set, as shown in Table 7, where gps_parallel_octree_coding_max_nodesize_log 2 specifies $d_{min}$ as $d_{min}$=M−gps_parallel_octree_coding_max_nodesize_log 2_minus1−1. In this case, gps_parallel_octree_coding_flag is not signaled but can be inferred from the value of gps_parallel_octree_coding_max_nodesize_log 2_minus1. For example, if gps_parallel_octree_coding_max_nodesize_log 2_minus1 equals zero, gps_parallel_octree_coding_flag is inferred to be 0. Otherwise, gps_parallel_octree_coding_flag is inferred to be 1.

TABLE 7

| | Descriptor |
|---|---|
| geometry_parameter_set( ) { | |
|   gps_geom_parameter_set_id | ne(v) |
|   ... | ... |
|   log2_trisoup_node_size | ne(v) |
|   gps_parallel_octree_coding_max_nodesize_log2_minus1 | ue(v) |
|   ... | ... |
|   byte_alignment( ) | |
| } | |

2. Signaling of Bitstream Offsets

Figure 7:
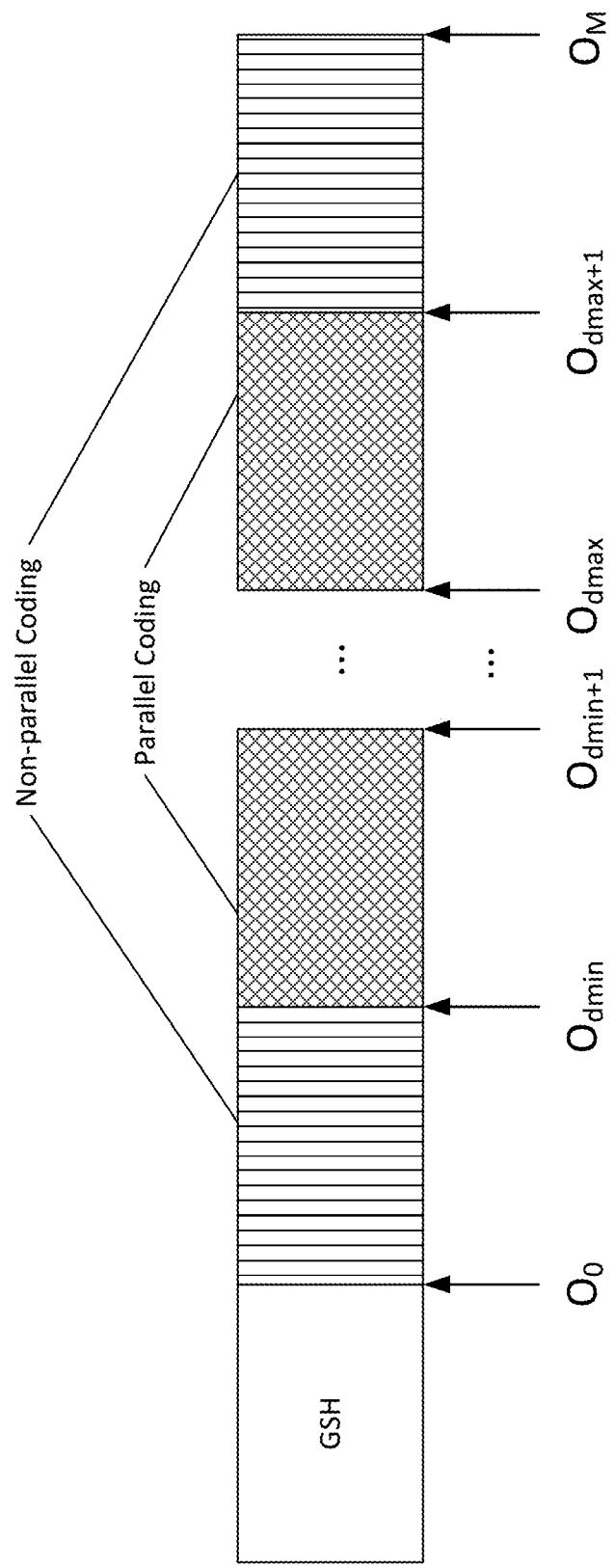
FIG. 7 shows an exemplary geometry octree bitstream according to an embodiment of the disclosure.

FIG. 7 shows a geometry octree bitstream that includes several parts according to an embodiment of the disclosure. The first part is a header, such as a geometry slice header (GSH) which contains the high level syntaxes used for geometry coding. The remaining part contains the octree coding sub-bitstream of each partition depth. In some embodiments, the remaining part can be further categorized into two parts, i.e., non-parallel and parallel octree coding, respectively.

To enable the parallel decoder parsing, the sub-bitstream of each parallel octree partition depth needs to be aligned in byte positions. Each sub-bitstream can have an integer length in bytes. In addition, the bitstream offset of each parallel octree partition depth, denoted by $O_d$, can be specified by an offset difference, i.e., $R_d = O_{d+1} − O_d$. It is noted that if $d_{max}$ equals M−1, $R_{d_{max}}$ is not signaled and can be inferred by the decoder. $O_{d_{min}}$ can be signaled explicitly or inferred from the bitstream where the octree partition depth $d_{min}$−1 ends. Therefore, the decoder can start parsing several octree depths from the specified bitstream segments in parallel. Specifically, the parsing of the depth d is from the bitstream position $O_d$ to $O_{d+1}$−1 with the length of $R_d$.

In an embodiment, the bitstream offsets are signaled in the geometry slice header, as shown in Table 8. For example, when gps_parallel_octree_coding_flag equals 1, gsh_parallel_octree_coding_bitstream_start_pos specifies the bitstream offset of the octree partition depth $d_{min}$ as $O_{d_{min}}$=gsh_parallel_octree_coding_bitstream_start_pos. Further, gsh_parallel_octree_coding_bitstream_range [d] specifies the bitstream length of the octree depth d as $R_d$=gsh_parallel_octree_coding_bitstream_range [d]. Therefore, the bitstream offset of the octree depth d can be computed as $$O_d = \begin{cases} O_{d_{min}} & \text{if } d = d_{min} \\ O_{d_{min}} + \sum_{i=d_{min}}^{d-1} R_i & \text{if } d_{min} < d \leq d_{max}+1 \end{cases} \quad \text{Eq. (1)}$$

TABLE 8

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |
|       gsh_box_log2_scale | ue(v) |
|     gsh_box_origin_x | ue(v) |
|     gsh_box_origin_y | ue(v) |
|     gsh_box_origin_z | ue(v) |
|   } | |
|   if (gps_parallel_octree_coding _flag) { | |
|     gsh_parallel_octree_coding_bitstream_start_pos | |
|     for (d = $d_{min}$; d <= $d_{max}$; d++) { | |
|       gsh_parallel_octree_coding_bitstream_range [ d ] | ue(v) |
|     } | |
|   } | |
|   gsh_log2_max_nodesize | ue(v) |
|   gsh_num_points | ue(v) |
|   byte_alignment( ) | |
| } | |

In an embodiment, the bitstream offsets are signaled in the geometry slice header, as shown in Table 9. For example, when gps_parallel_octree_coding_flag equals 1, gsh_parallel_octree_coding_bitstream_range [d] specifies the bitstream length of the octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d \leq d_{max}+1 \end{cases} \quad \text{Eq. (2)}$$

$O_{d_{min}}$ is inferred from the bitstream where the octree partition depth $d_{min}$−1 ends.

TABLE 9

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |
|       gsh_box_log2_scale | ue(v) |
|     gsh_box_origin_x | ue(v) |
|     gsh_box_origin_y | ue(v) |
|     gsh_box_origin_z | ue(v) |
|   } | |
|   if (gps_parallel_octree_coding _flag) { | |
|     for (d = $d_{min}$; d <= $d_{max}$; d++) { | |
|       gsh_parallel_octree_coding_bitstream_range [ d ] | ue(v) |
|     } | |
|   } | |
|   gsh_log2_max_nodesize | ue(v) |
|   gsh_num_points | ue(v) |
|   byte_alignment( ) | |
| } | |

In an embodiment, the bitstream offsets are signaled in the geometry slice header, as shown in Table 10. In this embodiment, gps_parallel_octree_coding_flag is not signaled but can be inferred from the value of gps_parallel_octree_coding_min_depth. For example, when gps_parallel_octree_coding_min_depth is larger than 0, gps_parallel_octree_coding_flag is inferred to be 1. Further, gsh_parallel_octree_coding_bitstream_range [d] specifies the bitstream length of the octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d \leq d_{max}+1 \end{cases} \quad \text{Eq. (3)}$$

$O_{d_{min}}$ is inferred from the bitstream where the octree partition depth $d_{min}$−1 ends.

TABLE 10

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |
|       gsh_box_log2_scale | ue(v) |
|     gsh_box_origin_x | ue(v) |
|     gsh_box_origin_y | ue(v) |
|     gsh_box_origin_z | ue(v) |
|   } | |
|   if (gps_parallel_octree_coding_min_depth > 0) { | |
|     for (d = $d_{min}$; d <= $d_{max}$; d++) { | |
|       gsh_parallel_octree_coding_bitstream_range [ d ] | ue(v) |
|     } | |
|   } | |
|   gsh_log2_max_nodesize | ue(v) |
|   gsh_num_points | ue(v) |
|   byte_alignment( ) | |
| } | |

In an embodiment, the bitstream offsets are signaled in the geometry slice header, as shown in Table 11. In this embodiment, gps_parallel_octree_coding_flag is not signaled but can be inferred from the value of gps_parallel_octree_coding_max_nodesize_log 2. For example, when gps_parallel_octree_coding_max_nodesize_log 2 is larger than 0, gps_parallel_octree_coding_flag is inferred to be 1. Further, gsh_parallel_octree_coding_bitstream_range [d] specifies the bitstream length of the octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d \leq d_{max}+1 \end{cases} \quad \text{Eq. (4)}$$

$O_{d_{min}}$ is inferred from the bitstream where the octree partition depth $d_{min}$−1 ends.

TABLE 11

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |

TABLE 11-continued

| | Descriptor |
|---|---|
| gsh_box_log2_scale | ue(v) |
| gsh_box_origin_x | ue(v) |
| gsh_box_origin_y | ue(v) |
| gsh_box_origin_z | ue(v) |
| } | |
| if (gps_parallel_octree_coding_max_nodesize_log2 > 0) { | |
|   for (d = dmin; d <= dmax; d++) { | |
|     gsh_parallel_octree_coding_bitstream_range [ d ] | ue(v) |
|   } | |
| } | |
| gsh_log2_max_nodesize | ue(v) |
| gsh_num_points | ue(v) |
| byte_alignment( ) | |
| } | |

In an embodiment, the bitstream offsets are signaled in the geometry slice header, as shown in Table 12. In this case, $d_{max}$ is set as M−1, and the bitstream length of the last octree partition depth is not signaled and can be inferred from the decoder. For example, when gps_parallel_octree_coding_flag equals 1, gsh_parallel_octree_coding_bitstream_range [d] specifies the bitstream length of octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d \leq M-1 \end{cases} \quad \text{Eq. (5)}$$

$O_{d_{min}}$ is inferred from the bitstream where the octree partition depth $d_{min}$−1 ends. The bitstream length of the last octree depth M−1, i.e., $R_{M-1}$, is not signaled and can be inferred to be from the position $O_{M-1}$ to the end of the bitstream.

TABLE 12

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |

TABLE 12-continued

| | Descriptor |
|---|---|
|     gsh_box_log2_scale | ue(v) |
|   gsh_box_origin_x | ue(v) |
|   gsh_box_origin_y | ue(v) |
|   gsh_box_origin_z | ue(v) |
|   } | |
| if (gps_parallel_octree_coding _flag) { | |
|   for (d = $d_{min}$; d < M − 1; d++) { | |
|     gsh_parallel_octree_coding_bitstream_range [ d ] | ue(v) |
|   } | |
| } | |
| gsh_log2_max_nodesize | ue(v) |
| gsh_num_points | ue(v) |
| byte_alignment( ) | |
| } | |

According to aspects of the disclosure, the bitstream offsets can be binarized and signaled in any form including Exp-Golomb coding, fixed-length coding, unary coding, and the like.

In an embodiment, the bitstream offsets can be specified in a geometry slice header by Exp-Golomb coding, as shown in Table 13. gsh_parallel_octree_coding_max_nodesize_log2_minus1 specifies the minimal octree depth that enables the parallel octree coding, i.e., $d_{min}$, as $d_{min}$=M−gps_parallel_octree_coding_max_nodesize_log 2_minus1−1, where M is the total number of the octree partition depths. For example, when gsh_parallel_octree_coding_max_nodesize_log 2_minus1 equals zero, the parallel octree coding is disabled. gsh_parallel_octree_coding_bitstream_start_pos specifies the bitstream offset of the octree depth $d_{min}$, i.e., as $O_{d_{min}}$=gsh_parallel_octree_coding_bitstream_start_pos. Further, gsh_parallel_octree_coding_bitstream_range [d] specifies the bitstream length of the octree depth d as $R_d$=gsh_parallel_octree_coding_bitstream_range [d]. The bitstream offset of octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d < M \end{cases} \quad \text{Eq. (6)}$$

where $O_d$ denotes the bitstream offset of each parallel octree partition depth. In an embodiment, $O_{d_{min}}$ is not signaled and can be inferred from the bitstream where the octree depth $d_{min}$−1 ends.

TABLE 13

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |
|       gsh_box_log2_scale | ue(v) |
|     gsh_box_origin_x | ue(v) |
|     gsh_box_origin_y | ue(v) |
|     gsh_box_origin_z | ue(v) |
|   } | |
|   gsh_parallel_octree_coding_max_nodesize_log2_minus1 | ue(v) |
|   if (gsh_parallel_octree_coding_max_nodesize_log2_minus1 > 0) { | |
|     gsh_parallel_octree_coding_bitstream_start_pos | ue (v) |
|     for (d = $d_{min}$ + 1; d < M − 1; d++) { | |
|       gsh_parallel_octree_coding_bitstream_range [ d ] | ue(v) |
|     } | |
|   } | |

TABLE 13-continued

| | Descriptor |
|---|---|
| gsh_log2_max_nodesize | ue(v) |
| gsh_num_points | ue(v) |
| byte_alignment( ) | |
| } | |

In an embodiment, the bitstream offsets can be specified in a geometry slice header by fixed-length coding, as shown in Table 14. gsh_parallel_octree_coding_max_nodesize_log 2_minus1 specifies the minimal octree depth that enables the parallel octree coding, i.e., $d_{min}$, as $d_{min}$=M-gps_parallel_octree_coding_max_nodesize_log 2_minus1-1, where M is the total number of the octree partition depths. For example, when gsh_parallel_octree_coding_max_nodesize_log 2_minus1 equals zero, the parallel octree coding is disabled. gsh_parallel_octree_coding_bitstream_start_pos specifies the bitstream offset of the octree depth $d_{min}$, i.e., as $O_{d_{min}}$=gsh_parallel_octree_coding_bitstream_start_pos. Further, gsh_parallel_octree_coding_bitstream_range [d] specifies the bitstream length of octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d < M \end{cases}, \quad \text{Eq. (7)}$$

where $O_d$ denotes the bitstream offset of each parallel octree partition depth. It is noted that, the bit-length is predefined in this embodiment. The bitstream offsets are coded by 64-bits in this embodiment and can be coded by other fixed lengths, such as 32-bits or 16-bits, in other embodiments. In addition, in an embodiment, $O_{d_{min}}$ is not signaled and can be inferred from the bitstream where the octree depth $d_{min}$-1 ends.

In an embodiment, the bitstream offsets can be specified in a geometry slice header by fixed-length coding as shown in Table 15. gsh_parallel_octree_coding_max_nodesize_log 2_minus1 specifies the minimal octree depth that enables the parallel octree coding, i.e., $d_{min}$, as $d_{min}$=M-gps_parallel_octree_coding_max_nodesize_log 2_minus1-1, where M is the total number of the octree partition depths. For example, when gsh_parallel_octree_coding_max_nodesize_log 2_minus1 equals zero, the parallel octree coding is disabled. gsh_parallel_octree_coding_bitstream_start_pos specifies the bitstream offset of the octree depth $d_{min}$, i.e., as $O_{d_{min}}$=gsh_parallel_octree_coding_bitstream_start_pos. Further, gsh_parallel_octree_coding_bitstream_range [d] specifies the bitstream length of octree depth d as $R_d$=gsh_parallel_octree_coding_bitstream_range [d]. The bitstream offset of the octree depth d is computed as $$O_d = \begin{cases} O_{d_{min}} & \text{if } d = d_{min} \\ O_{d_{min}} + \sum_{i=d_{min}}^{d-1} R_i & \text{if } d_{min} < d < M \end{cases}, \quad \text{Eq. (8)}$$

where $O_d$ denotes the bitstream offset of each parallel octree partition depth. It is noted that, compared to the previous embodiment which uses the predefined bit-length, in this embodiment, the bit-lengths of gsh_parallel_octree_coding_bitstream_range [d] and gsh_parallel_octree_coding_bitstream_start_pos are specified by gsh_parallel_octree_coding_offset_len, i.e., n=gsh_parallel_octree_coding_offset_len in u(n). In addi-

TABLE 14

| | Descriptor |
|---|---|
| geometry_slice_header( ) { | |
|   gsh_geometry_parameter_set_id | ue(v) |
|   gsh_tile_id | ue(v) |
|   gsh_slice_id | ue(v) |
|   if( gps_box_present_flag ) { | |
|     if( gps_gsh_box_log2_scale_present_flag ) | |
|       gsh_box_log2_scale | ue(v) |
|     gsh_box_origin_x | ue(v) |
|     gsh_box_origin_y | ue(v) |
|     gsh_box_origin_z | ue(v) |
|   } | |
|   gsh_parallel_octree_coding_max_nodesize_log2_minus1 | ue(v) |
|   if (gsh_parallel_octree_coding_max_nodesize_log2_minus1 > 0) { | |
|     gsh_parallel_octree_coding_bitstream_start_pos | u(64) |
|     for (d = $d_{min}$ + 1; d < M - 1; d++) { | |
|       gsh_parallel_octree_coding_bitstream_range [ d ] | u(64) |
|     } | |
|   } | |
|   gsh_log2_max_nodesize | ue(v) |
|   gsh_num_points | ue(v) |
|   byte_alignment( ) | |
| } | | tion, in an embodiment, $O_{d_{min}}$ is not signaled and can be inferred from bitstream where the octree depth $d_{min}-1$ ends.

TABLE 15

|  | Descriptor |
|---|---|
| geometry_slice_header( ) { |  |
|   gsh_geometry_parameter_set_id | ue(v) |
|   gsh_tile_id | ue(v) |
|   gsh_slice_id | ue(v) |
|   if( gps_box_present_flag ) { |  |
|     if( gps_gsh_box_log2_scale_present_flag ) |  |
|       gsh_box_log2_scale | ue(v) |
|     gsh_box_origin_x | ue(v) |
|     gsh_box_origin_y | ue(v) |
|     gsh_box_origin_z | ue(v) |
|   } |  |
|   gsh_parallel_octree_coding_max_nodesize_log2_minus1 | ue(v) |
|   if (gsh_parallel_octree_coding_max_nodesize_log2_minus1 > 0) { |  |
|     gsh_parallel_octree_coding_offset_len | u(6) |
|     gsh_parallel_octree_coding_bitstream_start_pos | u(n) |
|     for (d = $d_{min}$ + 1; d < M − 1; d++) { |  |
|       gsh_parallel_octree_coding_bitstream_range [ d ] | u(n) |
|     } |  |
|   } |  |
|   gsh_log2_max_nodesize | ue(v) |
|   gsh_num_points | ue(v) |
|   byte_alignment( ) |  |
| } |  |

3. Re-Initialization of Context Variables

According to aspects of the disclosure, for every octree partition depth (d) that is coded in parallel, probabilities of context variables, and in some cases all context variables, that are related to the octree coding need to be reinitialized. The probabilities can be reinitialized as a set of predefined probabilities or a probability state where the parallel coding is not started. Let $P_d$ and $P'_d$ denote the probability state of the related context variables before and after coding the octree partition depth d, respectively.

In an embodiment, the probabilities of the context variables in the depth d ($d_{min} \leq d \leq d_{max}$) are reinitialized to a predetermined values such as 0.5, i.e., $P_d = 0.5$.

In an embodiment, the probabilities of the context variables in the depth d ($d_{min} \leq d \leq d_{max}$) are reinitialized as a set of pre-trained probabilities. The training process can be performed offline and the trained probabilities can be available for both the encoder and decoder.

In an embodiment, the probabilities of the context variables in the depth d ($d_{min} \leq d \leq d_{max}$) are reinitialized as the same as those after coding the depth $d_{min}-1$, i.e., $P_d = P'_{d_{min}-1}$. In this case, the probability states of $P'_{d_{min}-1}$ need to be cached in advance for the rest of the octree partition depths.

In an embodiment, initial probabilities of the context variables in the depth d ($d_{min} \leq d \leq d_{max}$) are derived from, or reinitialized from, depth d−1. However, instead of coding all the nodes in the depth d−1, the probabilities for initializing the probabilities in the depth d can be derived after coding a subset of the nodes, for example, the first K nodes in the depth d−1, where K can be predefined or signaled in the bitstream, such as in the sequence parameter set, the geometry parameter set, or the geometry slice header. It is noted that the coding of the last one or more octree depths d ($d_{max}+1 \leq d \leq M-1$) can be either performed in parallel to the coding of the depth $d_{max}$ or performed after the coding of the depth $d_{max}$. If the coding of the last one or more octree depths is performed in parallel, the aforementioned re-initialization process can be applied to the depth $d_{max}+1$ as well.

In an embodiment, when the octree partition reaches the specified depth $d_{min}$, the probabilities of the context variables for the bit-wise coding can be stored in the memory. For the remaining octree partition depths that are to be processed in parallel, the probabilities of the context variables can be reinitialized to be the same as the stored ones. For example, this process can be invoked at the start of coding each octree depth as shown in Table 16, where NumCtx indicates the total number of contexts.

TABLE 16

| if (gps_parallel_octree_coding_flag && depth == $d_{min}$) |
|---|
|   CtxMap is cached in entries CtxMapSyld[ i ] = CtxMap[ i ] for i in the range 0 to NumCtx-1 |
| if (gps_parallel_octree_coding_flag && depth >= $d_{min}$) |
|   CtxMap is restored in entries CtxMap[ i ] = CtxMapSyld[ i ] for i in the range 0 to NumCtx-1. |

In an embodiment, when the octree partition reaches the specified depth the values of look-up tables for the byte-wise coding can be stored in the memory. For the remaining octree partition depths that are to be processed in parallel, the values of look-up tables can be reinitialized to be the same as the stored ones. For example, the related variables that are stored and recovered include (1) an array of values lut0[k] storing the most frequent symbols, where k is in the range of 0 to 31, inclusive; (2) an array of values lut0Histogram[k] storing the symbols occurrences, where k is in the range of 0 to 255, inclusive; (3) two variables lut0UpdatePeriod and lut0SymbolsUntilUpdate storing the update period for lut0 and the number of symbols remaining until the next update, respectively; (4) a variable lut0Reset specifying whether lut0 should be reset during the next lut0 update or not; (5) an array of values lul1[k] storing the last 16 decoded symbols with different values, where k is in the range of 0 to 15, inclusive; (6) a variable lut1IndexLastSymbol storing the index of the last decoded symbol; (7) a set of adaptive binary arithmetic contexts ctxLut0Hit, ctxLut1Hit, and ctxSymbolBit; (8) an array of adaptive binary arithmetic contexts ctxLut0Index of size 5 if limitedContextMode equals 1, and 31 otherwise (i.e., limitedContextMode equals 0), where the variable limitedContextMode specifies whether a limited number of contexts is used or not. For example, the re-initialization process is invoked at the start of coding each octree depth as shown in Table 17.

TABLE 17

```
if (gps_parallel_octree_coding_flag && depth == d_min) {
    for (k = 0; k < 32; k++)
        lut0Svld[k]= lut0[k];
    for (k = 0; k < 256; k++)
        lut0HistogramSvld[k] = lut0Histogram[k];
    lut0UpdatePeriodSvld = lut0UpdatePeriod;
    lut0SymbolsUntilUpdateSvld = lut0SymbolsUntilUpdate;
    lut0ResetSvld = lut0Reset;
    for (k = 0; k < 16; k++)
        lut1Svld[k]= lut1[k];
    lut1IndexLastSymbolSvld = lut1IndexLastSymbol;
    ctxLut0HitSvld = ctxLut0Hit;
    ctxLut1HitSvld = ctxLut1Hit;
    ctxSymbolBitSvld = ctxSymbolBit;
    for (k = 0; k < 32; k++)
        ctxLut0IndexSvld[k] = ctxLut0Index[k];
}
if (gps_parallel_octree_coding_flag && depth >= d_min) {
    for (k = 0; k < 32; k++)
        lut0[k]= lut0Svld[k];
    for (k = 0; k < 256; k++)
        lut0Histogram[k]= lut0HistogramSvld[k];
    lut0UpdatePeriod = lut0UpdatePeriodSvld;
    lut0SymbolsUntilUpdate = lut0SymbolsUntilUpdateSvld;
    lut0Reset = lut0ResetSvld;
    for (k = 0; k < 16; k++)
        lut1[k]= lut1Svld[k];
    lut1IndexLastSymbol = lut1IndexLastSymbolSvld;
    ctxLut0Hit = ctxLut0HitSvld;
    ctxLut1Hit = ctxLut1HitSvld;
    ctxSymbolBit = ctxSymbolBitSvld;
    for (k = 0; k < 32; k++)
        ctxLut0Index[k] = ctxLut0IndexSvld[k];
}
```

In an embodiment, when the octree partition reaches the specified depth the history values for planar coding mode can be stored in memory. For the remaining octree partition depths that are to be processed in parallel, the history values can be reinitialized to be the same as the stored ones. This re-initialization process is invoked at the start of coding each octree depth, as shown in Table 18.

TABLE 18

```
if (gps_parallel_octree_coding_flag && depth == d_min) {
    localDensitySvld = localDensity;
    for (axisIdx = 0; k < 2; k++) {
        planeRateSvld [axisIdx]= planeRate [axisIdx];
    }
}
if (gps_parallel_octree_coding_flag && depth >= d_min) {
    localDensity = localDensitySvld;
    for (axisIdx = 0; k < 2; k++) {
        planeRate [axisIdx]= planeRateSvld [axisIdx];
    }
}
```

4. Geometry Quantization

Adaptive geometry quantization allows different quantization step sizes for different geometry octree nodes. Constraints may be introduced to the geometry quantization scheme to simplify the process.

In an embodiment, the adaptive geometry quantization is only allowed for the nodes at one or more specific partition depths. For example, the adaptive geometry quantization is only allowed for the nodes at one specific partition depth.

In an embodiment, the quantization step sizes can only be a power of 2. In this case, the delta of quantization steps can be signaled in the form of log 2, and the implementation of quantization/de-quantization can be simplified by bit shifting.

In an embodiment, some geometry related coding tools may have interactions with the adaptive geometry quantization. To avoid these issues, additional constraints may be utilized. For example, the planar coding mode can be disabled for some cases. In the embodiment where the adaptive geometry quantization is only allowed at a specific partition depth, the planar coding mode can be disabled at the one depth above the specified depth.

IV. Flowchart

Figure 8:
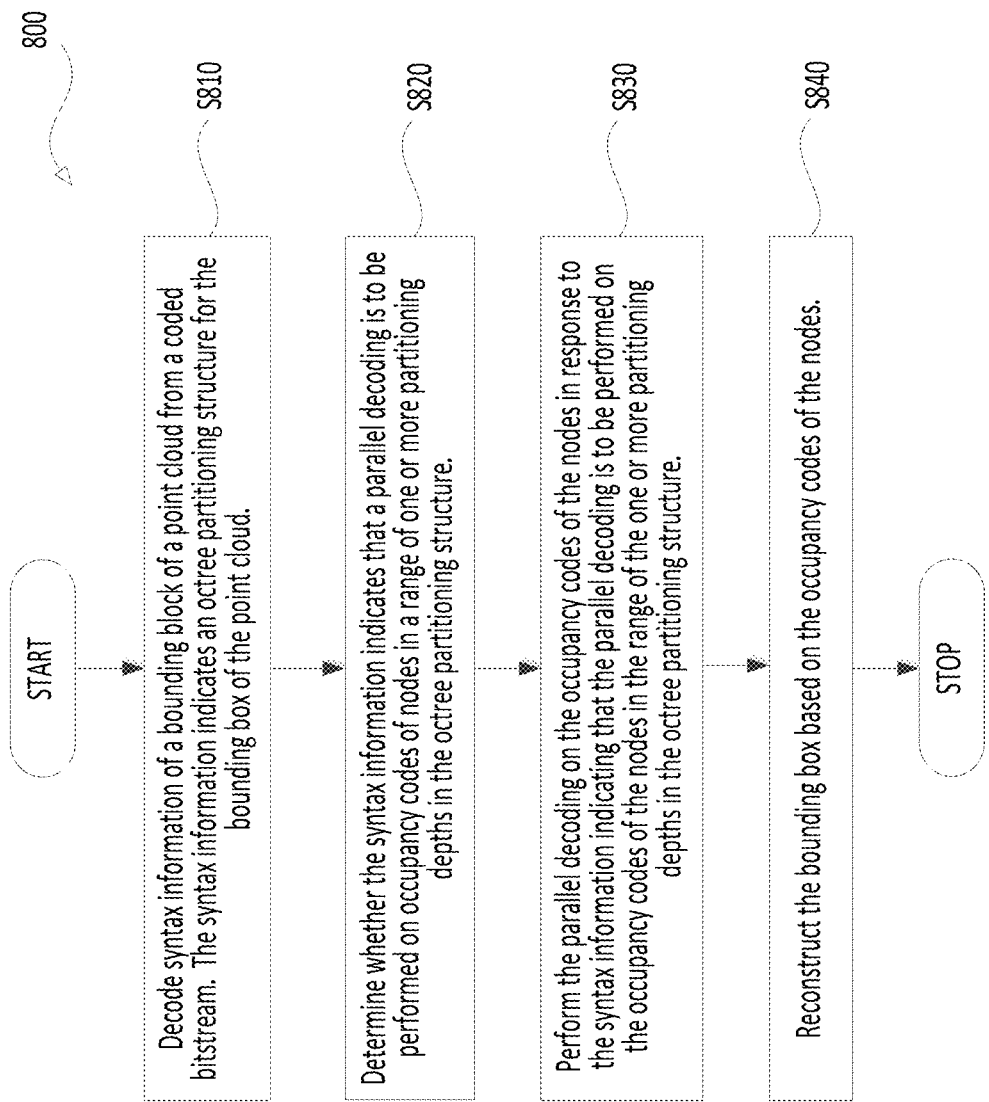
FIG. 8 shows a flow chart outlining a process example according to an embodiment of the disclosure.

FIG. 8 shows a flow chart outlining a process (800) according to an embodiment of the disclosure. The process (800) can be used during an encoding process or decoding process for PCC. In various embodiments, the process (800) is executed by processing circuitry, such as the processing circuitry in the terminal devices (110), the processing circuitry that performs functions of the encoder (203), the processing circuitry that performs functions of the encoder (300), and the like. In some embodiments, the process (800) is implemented in software instructions, thus when the processing circuitry executes the software instructions, the processing circuitry performs the process (800), which may start at (S810).

At step (S810), the process (800) decodes syntax information of a bounding box of a point cloud from a coded bitstream. The syntax information indicates an octree partitioning structure for the bounding box of the point cloud. Then, the process (800) proceeds to step (S820).

At step (S820), the process (800) determines whether the syntax information indicates that parallel decoding is to be performed on occupancy codes of nodes in a range of one or more partitioning depths in the octree partitioning structure. Then, the process (800) proceeds to step (S830).

At step (S830), the process (800) performs the parallel decoding on the occupancy codes of the nodes in response to the syntax information indicating that the parallel decoding is to be performed on the occupancy codes of the nodes in the range of the one or more partitioning depths in the octree partitioning structure. Then, the process (800) proceeds to step (S840).

At step (S840), the process (800) reconstructs the bounding box based on the occupancy codes of the nodes. Then, the process (800) terminates.

In an embodiment, the process (800) determines whether the syntax information indicates that the occupancy codes of the nodes in the range of the one or more partitioning depths in the octree partitioning structure are to be decoded in parallel based on one of a signaled flag and a minimum partitioning depth at which the parallel decoding is to be performed.

In an embodiment, the process (800) performs the parallel decoding on the occupancy codes of the nodes based on the minimum partitioning depth and a maximum partitioning depth at which the parallel decoding is to be performed. The maximum partitioning depth is equal to or less than a maximum partitioning depth of the octree partitioning structure.

In an embodiment, the process (800) determines a sub-bitstream in the coded bitstream for each of the one or more partitioning depths based on a bitstream offset corresponding to each of the one or more partitioning depths. The process (800) performs the parallel decoding on the sub-bitstreams of the one or more partitioning depths.

In an embodiment, the bitstream offset corresponding to each of the one or more portioning depths is included in the syntax information.

In an embodiment, the process (800) performs the parallel decoding on the occupancy codes of the nodes in the range of the one or more partitioning depths based on context variables of the occupancy codes.

In an embodiment, the process (800) determines initial probabilities of the context variables of the occupancy codes of the nodes as one or more predefined values.

In an embodiment, the process (800) determines initial probabilities of the context variables of the occupancy codes of the nodes based on probabilities of context variables of occupancy codes of parent nodes of a plurality of nodes. The plurality of nodes is in a minimum partitioning depth at which the parallel decoding is to be performed.

In an embodiment, the process (800) determines initial probabilities of the context variables of the occupancy codes of the nodes based on probabilities of context variables of occupancy codes of a subset of parent nodes of the nodes.

V. Computer System

The techniques described above, can be implemented as computer software using computer-readable instructions and physically stored in one or more computer-readable media. For example, FIG. 9 shows a computer system (900) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
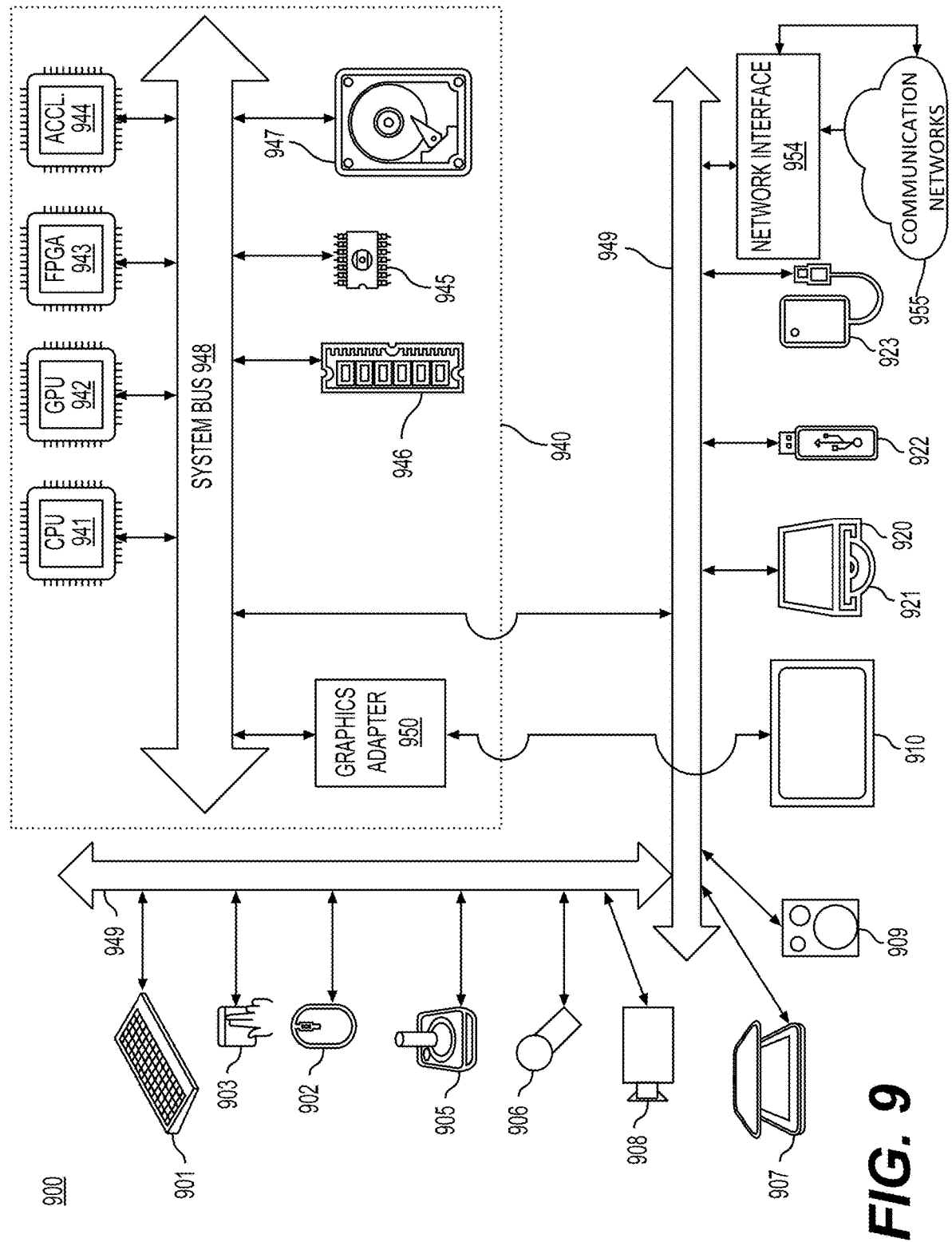
FIG. 9 shows a schematic illustration of a computer system according to an embodiment of the disclosure.

The components shown in FIG. 9 for computer system (900) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (910)) can be connected to a system bus (948) through a graphics adapter (950).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include a network interface (954) to one or more communication networks (955). The one or more communication networks (955) can for example be wireless, wireline, optical. The one or more communication networks (955) can further be local, wide-area, metropolitan, vehicular and industrial, real-time, delay-tolerant, and so on. Examples of the one or more communication networks (955) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), and so forth. These devices, along with Read-only memory (ROM) (945), Random-access memory (946), internal mass storage such as internal non-user accessible hard drives, SSDs, and the like (947), may be connected through the system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can be also stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for point cloud coding in a decoder, comprising:
   decoding syntax information of a point cloud from a coded bitstream, the syntax information indicating that parallel decoding is to be performed on occupancy codes of nodes in a range of one or more partitioning depths in an octree partitioning structure of the point cloud;
   performing the parallel decoding on the occupancy codes of the nodes; and
   reconstructing the point cloud based on the occupancy codes of the nodes.

2. The method of claim 1, wherein the syntax information includes at least one of a first syntax element or a second syntax element, the first syntax element indicating whether the parallel decoding is to be performed on the occupancy codes of the nodes in the range of the one or more partitioning depths in the octree partitioning structure, and the second syntax element indicating a minimum partitioning depth at which the parallel decoding is to be performed.

3. The method of claim 1, wherein the syntax information is included in at least one of a sequence parameter set, a geometry parameter set, or a geometry slice header.

4. The method of claim 1, wherein the performing further comprises:
   determining, in the coded bitstream, a sub-bitstream for each of the one or more partitioning depths based on a bitstream offset corresponding to each of the one or more partitioning depths; and
   performing the parallel decoding on the sub-bitstreams of the one or more partitioning depths.

5. The method of claim 4, wherein the bitstream offset corresponding to each of the one or more partitioning depths is determined based on the bitstream offset corresponding to a minimum partitioning depth at which the parallel decoding is to be performed and a length of the sub-bitstream corresponding to each of the one or more partitioning depths.

6. The method of claim 1, wherein the performing further comprises:
   performing the parallel decoding on the occupancy codes of the nodes in the range of the one or more partitioning depths based on a look-up table which tracks most frequent occupancy codes, the look-up table being initialized for each of the one or more partitioning depths.

7. The method of claim 6, further comprising:
   determining initial values of the look-up table for each of the one or more partitioning depths based on values of the look-up table corresponding to a partition depth that is one less than a minimum partitioning depth at which the parallel decoding is to be performed.

8. The method of claim 1, wherein the performing further comprises:
   performing the parallel decoding on the occupancy codes of the nodes in the range of the one or more partitioning depths based on a planar coding mode, values of the planar coding mode being initialized for each of the one or more partitioning depths.

9. The method of claim 8, further comprising:
determining initial values of the planar coding mode for each of the one or more partitioning depths based on the values of the planar coding mode corresponding to a partition depth that is one less than a minimum partitioning depth at which the parallel decoding is to be performed.

10. An apparatus for point cloud coding, comprising processing circuitry configured to:
decode syntax information of a point cloud from a coded bitstream, the syntax information indicating that parallel decoding is to be performed on occupancy codes of nodes in a range of one or more partitioning depths in an octree partitioning structure of the point cloud;
perform the parallel decoding on the occupancy codes of the nodes; and
reconstruct the point cloud based on the occupancy codes of the nodes.

11. The apparatus of claim 10, wherein the syntax information includes at least one of a first syntax element or a second syntax element, the first syntax element indicating whether the parallel decoding is to be performed on the occupancy codes of the nodes in the range of the one or more partitioning depths in the octree partitioning structure, and the second syntax element indicating a minimum partitioning depth at which the parallel decoding is to be performed.

12. The apparatus of claim 10, wherein the syntax information is included in at least one of a sequence parameter set, a geometry parameter set, or a geometry slice header.

13. The apparatus of claim 10, wherein the processing circuitry is further configured to:
determine, in the coded bitstream, a sub-bitstream for each of the one or more partitioning depths based on a bitstream offset corresponding to each of the one or more partitioning depths; and
perform the parallel decoding on the sub-bitstreams of the one or more partitioning depths.

14. The apparatus of claim 13, wherein the bitstream offset corresponding to each of the one or more partitioning depths is determined based on the bitstream offset corresponding to a minimum partitioning depth at which the parallel decoding is to be performed and a length of the sub-bitstream corresponding to each of the one or more partitioning depths.

15. The apparatus of claim 10, wherein the processing circuitry is further configured to:
perform the parallel decoding on the occupancy codes of the nodes in the range of the one or more partitioning depths based on a look-up table which tracks most frequent occupancy codes, the look-up table being initialized for each of the one or more partitioning depths.

16. The apparatus of claim 15, wherein the processing circuitry is further configured to:
determine initial values of the look-up table for each of the one or more partitioning depths based on values of the look-up table corresponding to a partition depth that is one less than a minimum partitioning depth at which the parallel decoding is to be performed.

17. The apparatus of claim 10, wherein the processing circuitry is further configured to:
perform the parallel decoding on the occupancy codes of the nodes in the range of the one or more partitioning depths based on a planar coding mode, values of the planar coding mode being initialized for each of the one or more partitioning depths.

18. The apparatus of claim 17, wherein the processing circuitry is further configured to:
determine initial values of the planar coding mode for each of the one or more partitioning depths based on the values of the planar coding mode corresponding to a partition depth that is one less than a minimum partitioning depth at which the parallel decoding is to be performed.

19. A non-transitory computer-readable medium storing instructions which when executed by a computer for point cloud coding cause the computer to perform:
decoding syntax information of a point cloud from a coded bitstream, the syntax information indicating that a parallel decoding is to be performed on occupancy codes of nodes in a range of one or more partitioning depths in an octree partitioning structure of the point cloud;
performing the parallel decoding on the occupancy codes of the nodes; and
reconstructing the point cloud based on the occupancy codes of the nodes.

20. The non-transitory computer-readable medium of claim 19, wherein the syntax information includes at least one of a first syntax element or a second syntax element, the first syntax element indicating whether the parallel decoding is to be performed on the occupancy codes of the nodes in the range of the one or more partitioning depths in the octree partitioning structure, and the second syntax element indicating a minimum partitioning depth at which the parallel decoding is to be performed.

* * * * *